March 17, 1970     R. J. MEGARGLE ET AL     3,501,196

METHOD OF FORMING MOTOR VEHICLE REAR WINDOW

Filed Jan. 13, 1967     2 Sheets-Sheet 1

March 17, 1970  R. J. MEGARGLE ET AL  3,501,196
METHOD OF FORMING MOTOR VEHICLE REAR WINDOW
Filed Jan. 13, 1967  2 Sheets-Sheet 2

INVENTORS
Robert J. Megargle
Daniel J. Jozwiak
BY

ATTORNEYS.

United States Patent Office 3,501,196
Patented Mar. 17, 1970

3,501,196
METHOD OF FORMING MOTOR VEHICLE REAR WINDOW
Robert J. Megargle, Grosse Pointe Park, and Daniel J. Jozwiak, Detroit, Mich., assignors to Chrysler Corporation, Highland Park, Mich., a corporation of Delaware
Filed Jan. 13, 1967, Ser. No. 611,215
Int. Cl. B23p 21/00
U.S. Cl. 296—145       7 Claims

ABSTRACT OF THE DISCLOSURE

A method of forming motor vehicle bodies in a continuous process wherein a sheet metal body structure having a relatively large rear window opening is first formed whereafter a fiber glass plug is inserted into the large rear window opening to provide a smaller rear window opening as defined by an opening in the plug. Also, the rear window construction resulting from this method.

Summary of the invention

It is an object of the present invention to provide an improved method for forming a motor vehicle body.

A more specific object is to provide a method of producing at least two different styles of motor vehicle body from one basic sheet metal body structure.

Yet another object is to provide an improved motor vehicle body construction.

The method of the invention, broadly stated, consists in forming a main body structure of sheet metal defining a relatively large window opening, forming a plug of non-metallic material defining a relatively smaller window opening, and inserting the non-metallic plug into the large window opening to provide a relatively smaller window opening in the resulting composite body structure. The method of the invention may also include the further step of applying a sheet of fabric material to the window area of the vehicle, whereby to conceal the joints between the non-metallic plug and the sheet metal body structure. The invention method may also include the further step of applying padding material to the joints between the plug and main body portion prior to the application of the fabric sheet, so that the fabric sheet will not imitate the outline of the joints. In the actual practice of the method of the invention in the assembly of motor vehicles, a plurality of sheet metal body structures are formed in a continuous process and the non-metallic plugs are inserted in a continuous process into the large window openings of selected ones of the main body structures so that the same basic sheet metal body structure provides two distinct body styles, one having a relatively large window opening and the other having a relatively small window opening.

Brief description of the drawings

A preferred embodiment of the invention is shown in the accompanying drawings.

In the drawings:

FIG. 3 is a view of a plug or filler employed in the motor vehicle body structure of FIG. 1.

Description of the preferred embodiment

Figure 1:
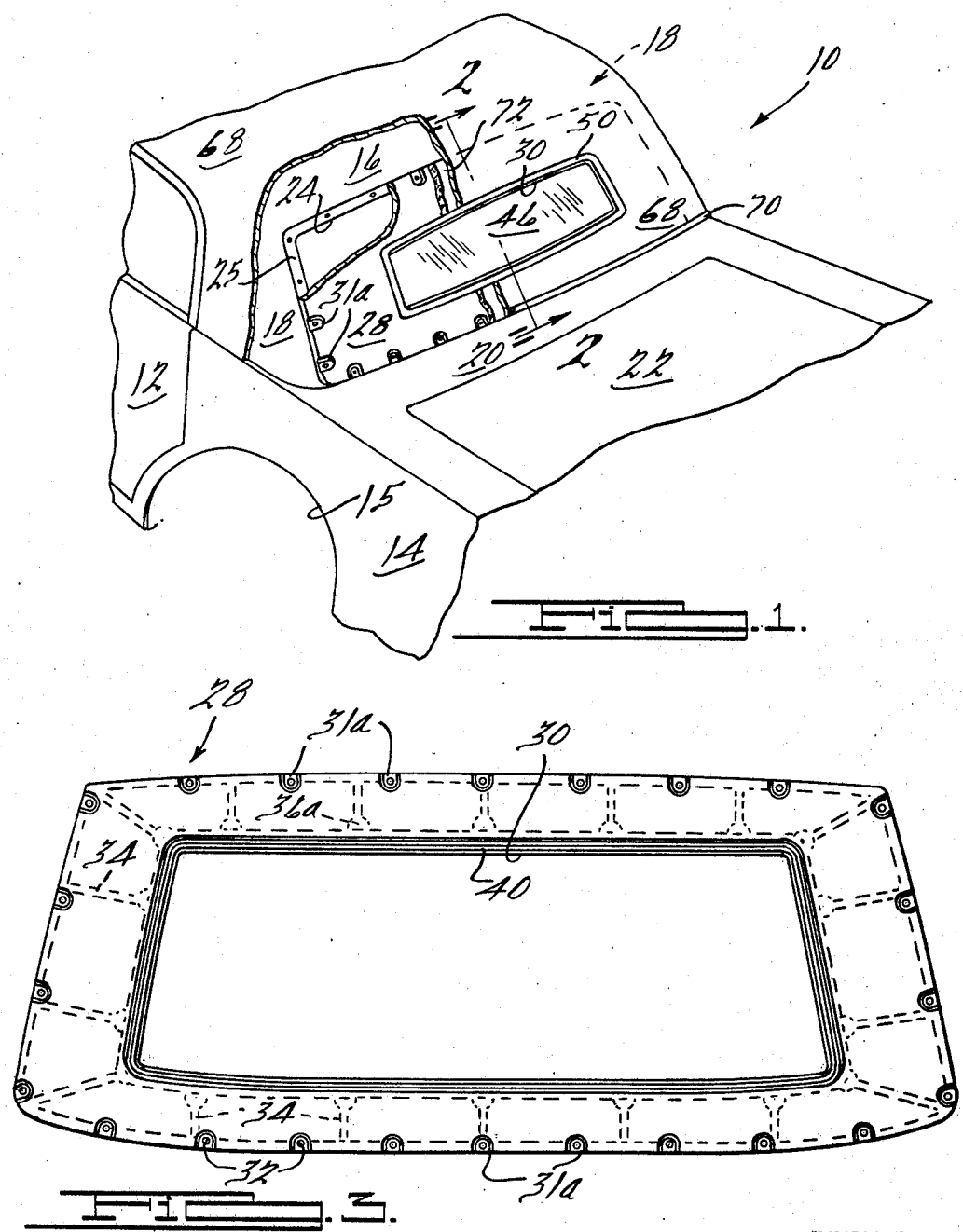
FIG. 1 is a fragmentary perspective view of a motor vehicle body structure embodying features of the present invention.

The motor vehicle body structure seen fragmentarily in FIG. 1 includes a main body structure 10 formed generally of sheet metal. Body structure 10 includes a left rear door 12, left quarter panel 14 defining a wheel opening 15, roof panel 16, roof pillars 18, upper deck panel 20 and deck lid 22. Roof pillars 18, roof panel 16, and upper deck panel 20 coact to define therebetween a relatively large window opening 24. Window opening 24 is bordered by the usual fence or flange 25 extending continuously around the window opening.

Figure 2:
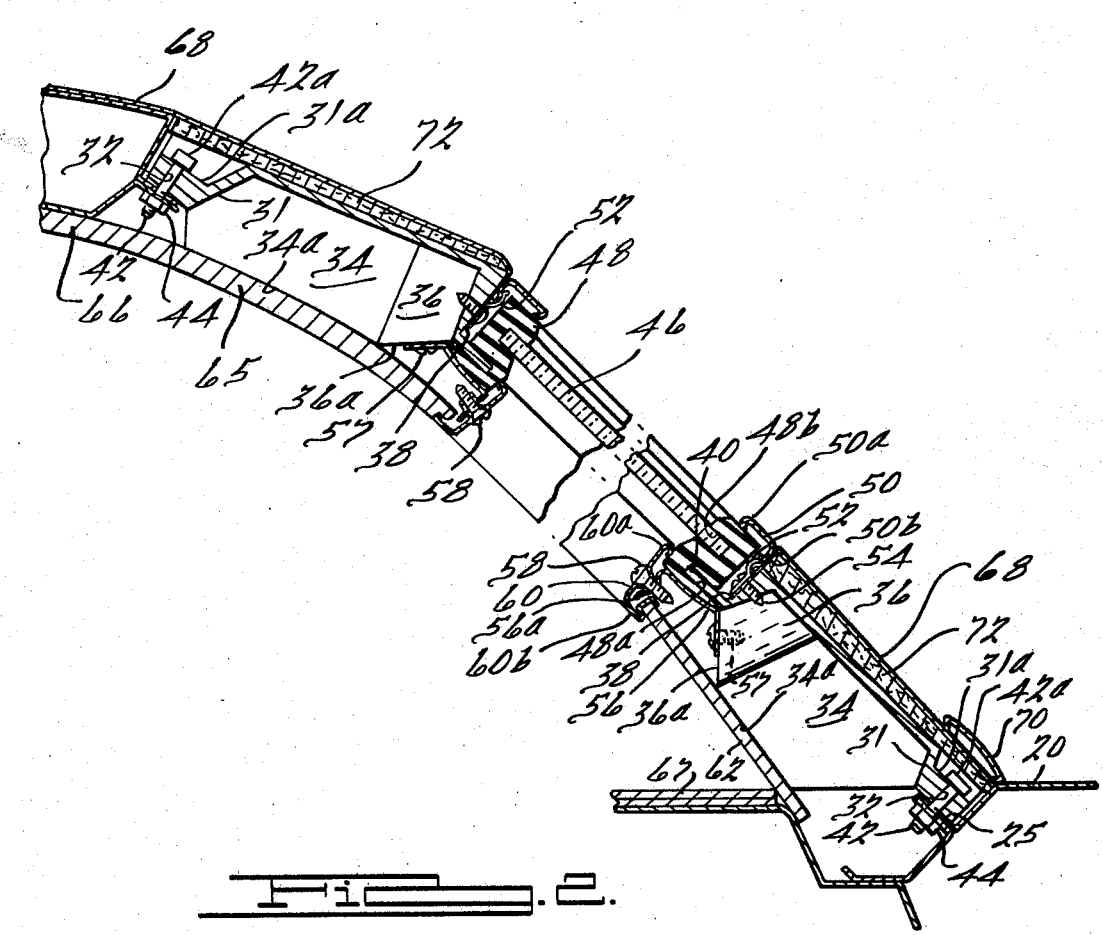
FIG. 2 is a cross-sectional view taken on line 2—2 of FIG. 1.

The motor vehicle body structure further includes a plug or filler 28 formed in a molding or pressing operation of a suitable non-metallic material such, for example, as fiber glass. Plug 28, as best seen in FIGS. 2 and 3, is generally rectangular and includes a central generally rectangular window opening 30 of small size relative to opening 24.

Plug 28 is thickened at a plurality of locations spaced about its outer periphery to provide a plurality of bosses 31. A bore 32 extends through each boss and the outer face 31a of each boss is countersunk with respect to outer face 28a of the main body of plug 28. Plug 28 further includes a plurality of ribs 34 spaced about its periphery. Each rib extends generally between the inner incide, and are combined, at the center line of plug 28 Each rib is laterally thickened adjacent the inner plug periphery to provide a molding support portion 36 having an upper angled face 36a. Ribs 34 and bosses 31 coincide, and are combined, at the center line of plug 28 but are independent at the various other locations. The inner periphery of plug 28 is stepped inwardly to provide an annular support surface 38 at the shoulder of the step and a fence or flange 40 extending completely and continuously around plug window opening 30.

As best seen in FIG. 1, non-metallic plug 28 is adapted to be inserted into window opening 24 defined by sheet metal main body structure 10 to reduce the size of the window opening to that of the relatively small window plug opening 30.

Plug 28 is maintained in place within opening 24 by a plurality of bolts 42 passing through bores 32 in bosses 30 and through suitable openings in body fence 24 for engagement with bolts 44. The heads 42a of bolts 42 are depressed below the plug outer surface 28a by virtue of the depressed position of boss surfaces 31a.

A window glass 46 is held in position within plug window opening 30 by a weatherstrip 48 of S-form extending continuously around window opening 30. Weatherstrip 48 is of known construction and includes a first slot 48a positioned over fence 40 and a second slot 48b receiving the outer periphery of glass 46. An outer molding strip 50 extends continuously around plug window opening 30. Molding strip 50 has an upstanding leg 50a positioned against the outer face of weatherstrip 48 and a lateral leg 50b held against plug shoulder surface 38 by a plurality of mounting clips 52 secured to plug 28 by screws 54. A molding supporting member 56 is secured in upstanding relation to the angled face 36a of each molding support portion 36 by screws 57. The upper leg 56a of each molding support member 56 is apertured to receive a sheet metal screw 58. Sheet metal screws 58 in turn maintain an inner molding strip 60 in a position in which leg 60a of a molding strip 60 bears against the upper face of weatherstrip 48. The other leg 60b of molding 60 hooks over the upper end of a trim panel 62 which is positioned against the upstanding inner edges 39a of ribs 39 and bears at its lower end against package-shelf panel 64. At the top and sides of window glass 46, inner molding 60 engages a trim member 65 formed as an extension of the usual headliner 66.

Since the joints formed by the juncture of plug 28 and body structure 10 are rather unsightly, it is considered preferable to cover the entire roof structure of the motor vehicle, including the plug 28, with a sheet 68 of fabric material. Sheet 68 is preferably formed of a vinyl material. In positioning vinyl top 68 around rear window glass 46, the edge of the vinyl sheet is positioned against shoulder surface 38 so that screws 54 clamp the edge of the vinyl between outer molding 50 and plug 28. The edge of the vinyl sheet adjacent upper deck panel 20 is positioned beneath a chrome plated body molding 70 provided at the belt line of the vehicle to conceal the lower juncture of plug 28 and body structure 10.

Since the vinyl sheet tends to imitate any irregularities in the body surface over which it is applied, such for example as might appear at the juncture of plug 28 and body structure 10, it is considered desirable to apply padding to the area adjacent the juncture of the plug 28 and body structure 10 prior to the application of the vinyl sheet. Such padding, which is seen at 72 in FIGS. 1 and 2, may extend all the way around the periphery of window opening 24 to conceal the entire juncture, or may be applied selectively where needed to allow the vinyl sheet to present a smooth exterior surface.

It will be understood that in the actual practice of the inventions, a plurality of body structure 10 will be formed in a continuous assembly line process and that the plugs 28 will be inserted in a continuous process into selected ones of the main body structures as these body structures are processed in a continuous assembly operation. Those body structures supplied with the plug will thereby achieve a limousine or formal type body structure with the classical small rear window, whereas those not supplied with the plugs will retain the more conservative large window opening typical of a sedan. The method of the invention thus allows the production of at least two different motor vehicle body styles from one basic sheet metal body structure.

While a preferred embodiment of the invention has been illustrated and described in detail, it is to be understood that various changes may be made in the disclosed embodiment without departing from the scope or spirit of the invention as defined by the appended claims.

We claim:

1. A method of forming a motor vehicle body comprising the steps of
    (A) forming a main body structure of sheet metal or other rigid material defining a relatively large rear window opening;
    (B) forming a flange on said body structure extending completely around the periphery of said large area window opening and depressed with respect to the rear face of said opening to define a rearwardly opening seat within said large area window opening;
    (C) forming a rigid plug of non-metallic material having a peripheral edge thickness approximating the depressed depth of said seat and defining a relatively small window opening;
    (D) inserting said plug from the rear of said body structure into said large rear window opening to position the peripheral edge of said plug against said flange and position the plug within said seat with the rear face of the plug generally flush with the rear face of the adjacent body structure portions; and
    (E) securing said plug to said body structure with fastener members engaging said peripheral edge and said flange, whereby to provide a relatively small window opening in said body structure.

2. A method of forming a motor vehicle body comprising the steps of
    (A) forming a main body structure of sheet metal defining a relatively large window opening;
    (B) forming a plug of non-metallic material defining a relatively small window opening;
    (C) inserting said plug into said large window opening to provide a relatively small window opening in said body structure; and
    (D) applying a sheet of fabric material to at least the area at and adjacent to the juncture of said plug and said main body structure, whereby to conceal said juncture.

3. The method of claim 2 and further including the step of
    (E) applying padding material to said juncture area prior to application of said fabric sheet, whereby to prevent said fabric sheet from imitating the outline of said juncture.

4. A method of producing at least two different motor vehicle body styles from one basic sheet metal body structure comprising the steps of
    (A) forming in a continuous process a plurality of main body structures of sheet metal each defining a relatively large rear window opening;
    (B) forming a plurality of plugs of non-metallic material each defining a relatively small window opening; and
    (C) inserting in a continuous process one of said plugs into the large rear window openings of selected ones of said main body structures, whereby to provide from the same basic sheet metal body structure a first body style having a relatively small rear window opening and a second body style having a relatively large rear window opening.

5. A method of producing at least two different motor vehicle body styles from one basic sheet metal body structure comprising the steps of
    (A) forming in a continuous process a plurality of main body structures of sheet metal each defining a relatively large window opening;
    (B) forming a plurality of plugs of non-metallic material each defining a relaitvely small window opening;
    (C) inserting in a continuous process one of said plugs into the large window openings of selected ones of said main body structures, whereby to provide from the same basic sheet metal body structure a first body style having a relatively small window opening and a second body style having a relatively large window opening; and
    (D) applying, to those selected main body structures that have received a plug, a sheet of fabric material to at least the area at and adjacent to the juncture of said plug and said main body structure whereby to conceal said juncture.

6. The method of claim 5 and including the further step of
    (E) applying to those selected main body structures that have received a plug, padding material to said juncture area prior to application of said fabric sheet, whereby to prevent said fabric sheet from imitating the outline of said juncture.

7. A motor vehicle body structure comprising
    (A) a main body structure of sheet metal or other rigid material defining a relatively large rear window opening;
    (B) a flange on said body structure extending completely around the periphery of said opening and depressed with respect to the rear face of said opening to define a rearwardly opening seat within said large rear window opening;
    (C) a plug of rigid non-metallic material positioned against said flange within said seat, said plug including a relatively thin main body portion, thickened portions adjacent the outer periphery of said main body portion for receipt of fastener members to secure said plug within said seat, a reinforced inner peripheral portion defining a relatively small rear window opening, and a plurality of ribs formed on the forward face of said main body portion and extending generally from the inner to the outer periphery of said plug;
    (D) a window member of transparent material positioned within said small rear window opening defined by the reinforced inner peripheral portion of said plug; and (E) inner trim members seating against the forward edge faces of said plurality of ribs to complete the interior rear window trim.

References Cited

UNITED STATES PATENTS

| | | | |
|---|---|---|---|
| 1,318,234 | 10/1919 | Shepardson | 296—145 |
| 2,105,180 | 1/1938 | Blessin | 52—208 |
| 2,495,022 | 1/1950 | Robbins | 296—145 |
| 2,730,381 | 1/1956 | Curtiss. | |
| 2,779,092 | 1/1957 | Gordon | 29—430 |
| 2,834,071 | 5/1958 | Camerino | 52-202 |
| 3,124,224 | 3/1964 | Paul et al. | 52—208 |

CHARLIE T. MOON, Primary Examiner

U.S. Cl. X.R.

49—62; 29—430, 469; 52—208; 160—116